United States Patent

[11] 3,626,914

| [72] | Inventors | Donald A. Brownson<br>Flushing;<br>Wayne S. Schoeppach, Mount Morris,<br>both of Mich. |
|---|---|---|
| [21] | Appl. No. | 885,059 |
| [22] | Filed | Dec. 15, 1969 |
| [45] | Patented | Dec. 14, 1971 |
| [73] | Assignee | General Motors Corporation<br>Detroit, Mich. |

[54] IGNITION TIMING CONTROL AND VACUUM CONTROL UNIT
7 Claims, 4 Drawing Figs.

| [52] | U.S. Cl. | 123/117 A |
|---|---|---|
| [51] | Int. Cl. | F02p 5/10 |
| [50] | Field of Search | 123/117 A, 97 |

[56] References Cited
UNITED STATES PATENTS

| 3,479,988 | 11/1969 | Walker | 123/117 A |
|---|---|---|---|
| 3,503,376 | 3/1970 | Walker | 123/117 A |
| 3,521,609 | 7/1970 | Kashiwagi et al. | 123/117 A |

*Primary Examiner*—Laurence M. Goodridge
*Assistant Examiner*—Cort R. Flint
*Attorneys*—J. L. Carpenter and C. K. Veenstra

ABSTRACT: A vacuum control unit in an ignition timing control system has a stop member which permits only partial vacuum advance during closed throttle operation and which is moved to permit full vacuum advance during open throttle operation.

INVENTORS
Donald A. Brownson &
BY Wayne S. Schoeppach
C. K. Veenstra
ATTORNEY

INVENTORS
Donald A. Brownson &
BY Wayne S. Schoeppach

C.K. Veenstra
ATTORNEY 3,626,914

IGNITION TIMING CONTROL AND VACUUM CONTROL UNIT

SUMMARY OF THE INVENTION

It is well established that the ignition timing characteristics of an internal combustion engine must be considered in achieving effective control over its exhaust emissions. For this and other reasons, a wide variety of systems and devices have been proposed which modify conventional vacuum control of ignition timing.

We have discovered that in some situations appropriate ignition timing is obtained by permitting full vacuum advance during open throttle operation and only partial vacuum advance during closed throttle operation.

This invention provides an ignition timing control and a vacuum control unit by which this discovery was made. In the embodiments set forth herein, this ignition timing control senses induction vacuum signals below the throttle to operate a diaphragm which is connected to the distributor, and additionally senses induction vacuum signals adjacent the throttle to operate a stop member which alternatively permits full or partial movement of the diaphragm. When the throttle is closed, the stop member limits movement of the diaphragm, thus preventing full vacuum advance; when the throttle is open, vacuum signals applied to the stop member cause it to move with and permit full travel of the diaphragm, thus permitting full vacuum advance.

The details as well as other objects and advantages of this invention are set forth in the drawings and in the description of two embodiments.

DESCRIPTION OF THE PREFERRED EMBODIMENTS

Figure 1:
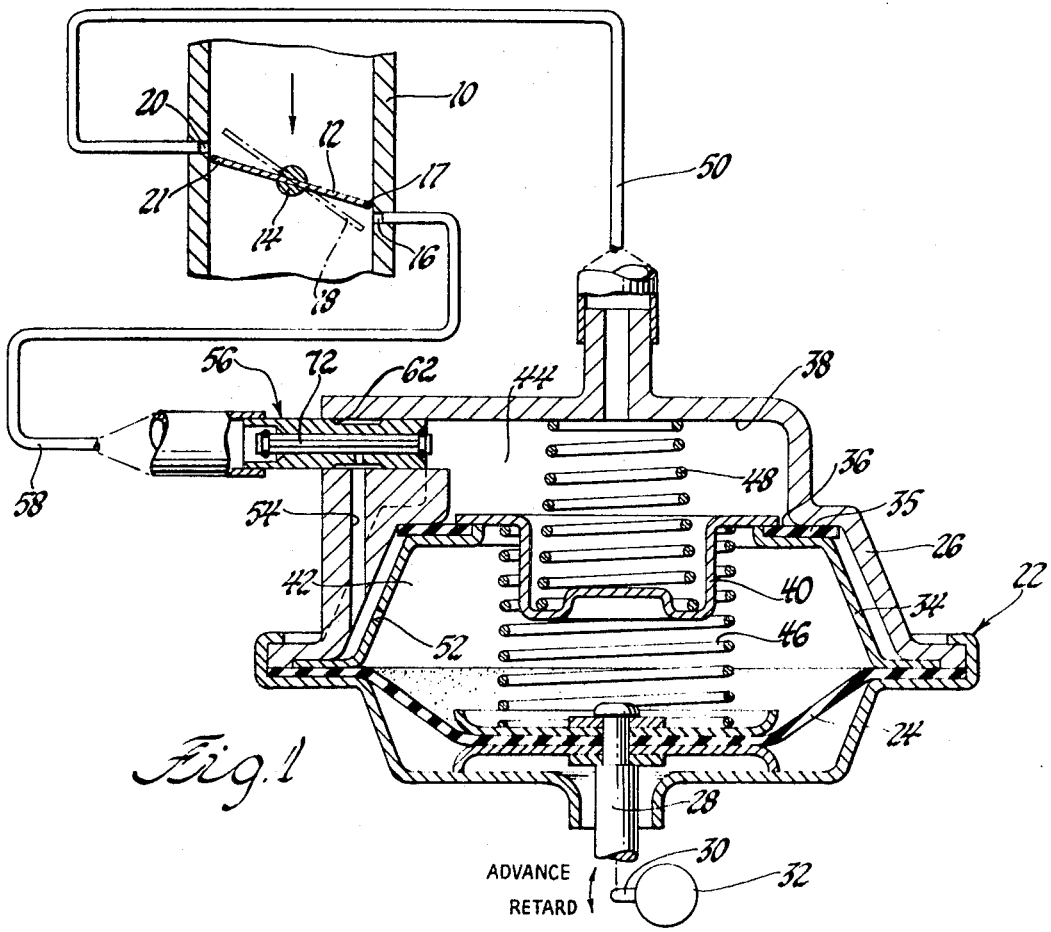
FIG. 1 is a schematic view of the ignition timing control showing the vacuum control unit and its connections to the induction passage and the distributor.

Referring first to FIG. 1, an air induction passage 10 contains a throttle 12 rotatably disposed on a shaft 14. Induction passage 10 has a port 16 opening therefrom at a location just below the downstream edge 17 of throttle 12 when throttle 12 is closed and which is traversed by downstream edge 17 of throttle 12 as throttle 12 is opened, as indicated by its dotted line position 18. Induction passage 10 also has a port 20 opening therefrom at a location just upstream of the upstream edge 21 of throttle 12 when throttle 12 is closed and which is traversed by upstream edge 21 of throttle 12 as throttle 12 is opened. Thus port 16 senses induction vacuum signals below throttle 12 when throttle 12 is closed, and port 20 senses induction vacuum signals below throttle 12 when throttle 12 is open.

A vacuum control unit 22 contains a pressure-responsive diaphragm 24 clamped within a housing 26. A plunger 28 is secured to diaphragm 24 and extends to an arm 30 of a distributor 32. Arm 30 here represents a device, such as the breaker plate in a conventional distributor, which moves to vary the ignition timing.

A stamping 34 secured within vacuum control unit 22 supports a sealing ring 35 which forms a shoulder 36 facing the base 38 of housing 26. A generally rigid stop plate member 40 is received by shoulder 36 and divides the enclosure formed between diaphragm 24 and housing 26 into first and second chambers 42 and 44. A spring 46 disposed between diaphragm 24 and plate 40 biases diaphragm 24 away from plate 40 and toward a retarded ignition timing position. A spring 48 disposed between plate 40 and base 38 biases plate 40 against shoulder 36.

A conduit 50 connects chamber 44 with port 20 in induction passage 10. Induction vacuum signals are thus applied to chamber 44 and to the chamber 44 side of plate member 40 only when throttle 12 is open.

An aperture 52 in stamping 34 and a passage 54 lead from chamber 42 to a valve unit 56. It will be noted that the right-hand end of valve unit 56 opens into chamber 44 and is therefore subjected to induction vacuum signals from port 20 when throttle 12 is open. The left-hand end of valve unit 56 is connected to port 16 in induction passage 10 by a conduit 58 and is thus subjected to induction vacuum signals when throttle 12 is closed.

Figure 2:
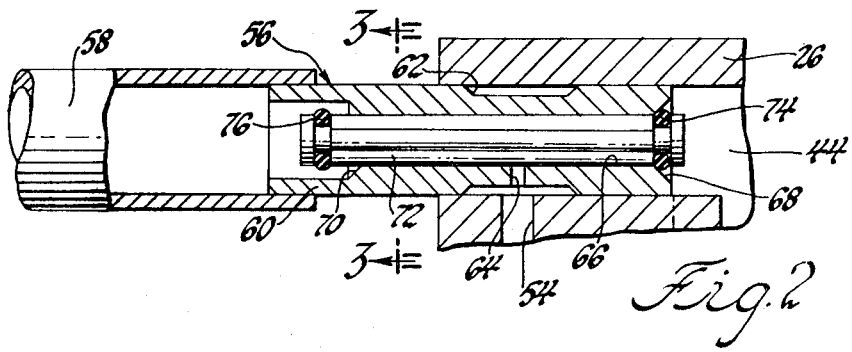
FIG. 2 is an enlarged view of a portion of FIG. 1 showing a valve unit which controls application of induction vacuum signals to the diaphragm.

As shown in greater detail in FIG. 2, valve unit 56 comprises a body 60 having a groove 62 formed thereabout which registers with passage 54 in housing 26. An aperture 64 connects groove 62 with a central bore 66 in valve body 60. Bore 66 has a pair of beveled valve seats 68 and 70 at opposite ends thereof.

Figure 3:
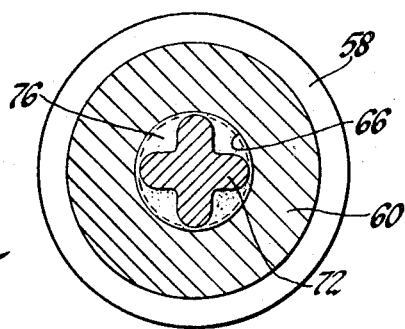
FIG. 3 is a sectional view along line 3—3 of FIG. 2 further enlarged to show details of the valve unit.

A poppet valve member 72, having a cross-shaped cross-section as shown in FIG. 3, is received in bore 66 and is provided with "O" rings 74 and 76 at each end thereof. "O" rings 74 and 76 register with beveled valve seats 68 and 70 respectively to alternatively permit application of induction vacuum signals to passage 54 from the right- or left-hand ends of valve unit 56.

In operation, when the throttle is closed as shown in FIG. 1, port 20 will sense the essentially atmospheric pressure above throttle 12 and induction vacuum signals will not be applied to chamber 44 of vacuum control unit 22. At the same time, port 16 will sense the induction vacuum signals below throttle 12. Poppet valve 72 will be moved toward the left by the pressure differential thereacross, "O" ring 74 then seating on beveled seat 68 and "O" ring 76 then moving away from beveled seat 70. Induction vacuum signals from port 16 will then be applied through conduit 58 and passage 54 to chamber 42, and diaphragm 24 will be moved upwardly to advance the ignition timing. However, the downwardly acting pressure differential across stop member 40, together with the downward bias of spring 48 against stop member 40, will prevent stop member 40 from moving. Thus movement of diaphragm 24 and concomitant advance of the ignition timing will be limited by stop member 40.

When throttle 12 is open, induction vacuum signals from port 20 will be applied through conduit 50 to chamber 44. At the same time, port 16 will sense the essentially atmospheric pressure above throttle 12. Poppet valve member 72 will then be moved toward the right by the pressure differential thereacross, "O" ring 76 then seating on beveled seat 70 and "O" ring 74 then moving away from seat 68. Induction vacuum signals from port 20, applied through conduit 50 to chamber 44, will then be applied from chamber 44 through passage 54 to chamber 42, and diaphragm 24 will be moved upwardly to advance the ignition timing. Further, the pressures on opposite sides of stop member 40 are then equalized, and stop member 40 moves upwardly against the bias of spring 48 as it is contacted by diaphragm 24.

Therefore, only partial vacuum advance of ignition timing is available when throttle 12 is closed, and full vacuum advance of ignition timing is available when throttle 12 is open.

Figure 4:
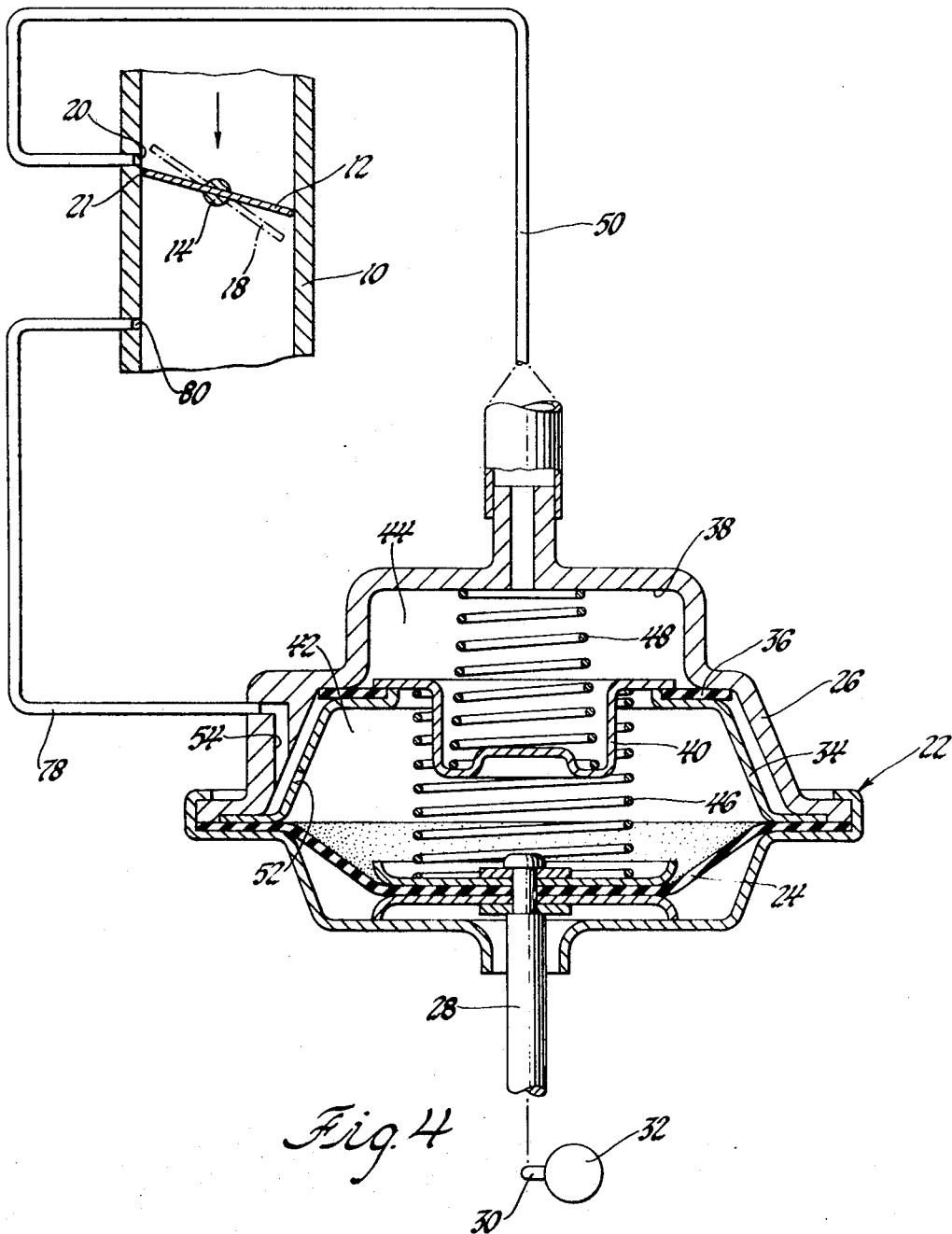
FIG. 4 is a schematic view, similar to that of FIG. 1, showing an alternative embodiment of the ignition timing control which does not require the valve unit.

FIG. 4 illustrates an alternative embodiment of this ignition timing control. In this embodiment, the induction passage and throttle, the vacuum control unit, and the distributor remain the same and are indicated by identical reference numerals. In this embodiment, however, valve unit 56 is not used and passage 54 is connected directly to induction passage 10 through a conduit 78 which leads to a port 80 located entirely downstream of throttle 12. Thus induction vacuum signals are continuously applied to chamber 42 from one induction passage port irrespective of throttle position.

It is evident that the operation of the FIG. 4 embodiment is the same as that of the FIG. 1 embodiment; full advance of ignition timing is available when throttle 12 is open and induction vacuum signals are applied from port 20 through conduit 50 to chamber 44, and only partial vacuum advance of ignition timing is available when throttle 12 is closed and induction vacuum signals are not applied to chamber 44.

It will be recognized that modifications of both the vacuum control unit and the ignition timing control system are feasible. For example, rigid stop member 40 could be replaced by a diaphragm which would be secured around its outer perimeter to housing 26 and entirely separate chamber 42 from chamber 44. Moreover, other means could be provided to position a stop member which would limit travel of diaphragm 24 in accordance with throttle position.

We claim:

1. A vacuum control unit comprising a housing, a pressure responsive diaphragm secured to said housing to form an enclosure therebetween, said housing having a shoulder extending about said enclosure generally parallel to said diaphragm, a pressure responsive member engageable with said shoulder to divide said enclosure into a first chamber disposed between said member and said diaphragm and a second chamber disposed between said member and said housing and also engageable with said diaphragm to limit movement thereof, means for applying vacuum signals to said first chamber and for selectively applying vacuum signals to said second chamber, first spring means biasing said diaphragm away from said member and permitting movement of said diaphragm toward said member upon application of vacuum signals to said first chamber, and second spring means biasing said member into engagement with said shoulder and preventing movement of said member away from said shoulder upon application of vacuum signals only to said first chamber and permitting movement of said member away from said shoulder upon application of vacuum signals to said second chamber, whereby said member provides a movable stop means for permitting full travel of said diaphragm upon application of vacuum signals to said first and second chambers and for permitting only partial travel of said diaphragm upon application of vacuum signals only to said first chamber.

2. An ignition timing control for an internal combustion engine comprising an ignition distributor, the vacuum control unit of claim 1, means connecting said diaphragm to said distributor for varying the timing of ignition in accordance with the position of said diaphragm and for advancing the ignition timing upon application of vacuum signals to said first chamber, an air induction passage for said engine, and a throttle disposed in said air induction passage movable between open and closed positions for controlling air flow therethrough, and wherein said means for selectively applying vacuum signals to said second chamber includes means for applying vacuum signals to said second chamber only when said throttle is in open position and for preventing application of vacuum signals to said second chamber when said throttle is in closed position whereby full travel of said diaphragm and concomitant full advance of ignition timing is available when said throttle is in open position and whereby only partial travel of said diaphragm and concomitant partial advance of ignition timing is available when said throttle is in closed position.

3. The ignition timing control of claim 2 wherein said means for selectively applying vacuum signals to said second chamber comprises conduit means opening into said air induction passage adjacent said throttle and traversed by said throttle as said throttle is moved between open and closed positions whereby said conduit means senses and applies to said second chamber the pressure in said air induction passage upstream of said throttle when said throttle is in closed position and the vacuum signals in said air induction passage downstream of said throttle when said throttle is in open position.

4. An ignition timing control for an internal combustion engine having a distributor for controlling ignition in the engine and including a device for varying the timing of ignition, an induction passage for air flow to the engine, and a throttle disposed in said induction passage and movable between open and closed positions for controlling airflow therethrough, said control comprising a housing having a base portion, a pressure responsive diaphragm secured to said housing generally parallel to said base portion to form an enclosure therebetween, said housing having a shoulder extending about said enclosure between and generally parallel to said base portion and said diaphragm and facing said base portion, a substantially rigid pressure responsive member engageable with said shoulder to divide said enclosure into a first chamber between said member and said diaphragm and a second chamber between said member and said base portion and also engageable with said diaphragm to limit movement thereof, first conduit means connecting said first chamber with said induction passage downstream of said throttle to thereby subject said diaphragm and the first chamber side of said rigid member to induction vacuum signals, means connecting said diaphragm with said device to thereby vary the ignition timing in accordance with the response of said diaphragm to the induction vacuum signals, first spring means extending between said rigid member and said diaphragm to bias said diaphragm away from said member and permitting movement of said diaphragm toward said member upon an increase in the induction vacuum signals, second conduit means connecting said second chamber with said induction passage at a location upstream of said throttle when said throttle is in closed position and downstream of said throttle when said throttle is in open position to thereby subject the second chamber side of said rigid member to induction vacuum signals when said throttle is open, and second spring means extending between said base portion and said rigid member to bias said member away from said base portion and to assist the effect of the induction vacuum signals on the first chamber side of said member in preventing movement of said member away from said shoulder upon application of induction vacuum signals only to said first chamber and permitting movement of said member away from said shoulder upon application of vacuum signals to said second chamber, whereby said member provides a movable stop means for permitting full vacuum advance of ignition timing when said throttle is in open position and for permitting only partial vacuum advance of ignition timing when said throttle is in closed position.

5. The ignition timing control of claim 4 wherein said first conduit means includes a first branch passage extending from said induction passage at a location downstream of said throttle when said throttle is in closed position and upstream of said throttle when said throttle is in open position to thereby sense induction vacuum signals when said throttle is closed, a second branch passage extending from said second conduit means to thereby sense induction vacuum signals when said throttle is open, and valve means in said first conduit means responsive to the pressure differential between said branch passages for connecting said first branch passage to said first chamber when said throttle is closed and for connecting said second branch passage to said first chamber when said throttle is open whereby induction vacuum signals are applied to said first chamber when said throttle is in both closed and open position.

6. An ignition timing control for use in an internal combustion engine having an induction passage for airflow to the engine, a throttle in said induction passage movable between open and closed positions for controlling air flow therethrough, and distributor means for controlling ignition in the engine including a device for varying the timing of ignition, said control comprising a member movable in response to variations in pressure in said induction passage and adapted for connection to said device to advance the timing of ignition in response to a decrease in pressure, and stop means disposed in the path of movement of said member for limiting movement thereof and movable in accordance with the position of said throttle for permitting greater movement of said member when said throttle is in open position that when said throttle is in closed position, whereby said control may cause said distributor means to advance the timing of ignition to a greater extent when said throttle is in open position than when said throttle is in closed position.

7. An internal combustion engine ignition timing control comprising a distributor for controlling ignition in the engine, an air inlet for airflow to the engine, a throttle disposed in said inlet for controlling airflow therethrough, said throttle being rotatable between open and closed positions, a first pressure-sensing port opening from said inlet at a location downstream of said throttle, a second pressure-sensing port opening from said inlet at a location upstream of the upstream edge of said throttle when said throttle is closed and downstream of the upstream edge of said throttle when said throttle is open, and control means connected to said distributor and responsive to the pressure in said inlet at said first port for adjusting the timing of the ignition controlled by said distributor and for causing the ignition timing to be advanced upon a decrease in such pressure, said control means including stop means responsive to the pressure in said inlet at said second port for limiting the advance of ignition timing by said control means, said stop means permitting full advance of the ignition timing by said control means when said throttle is open and said second port senses the pressure in said inlet downstream of said throttle and permitting only partial advance of the ignition timing when said throttle is closed and said second port senses the pressure in said inlet upstream of said throttle.

* * * * *